United States Patent [19]

Bridgeford et al.

[11] Patent Number: 4,789,006

[45] Date of Patent: Dec. 6, 1988

[54] CELLULOSE AMINOMETHANATE SAUSAGE CASINGS

[75] Inventors: Douglas J. Bridgeford; Matiur Rahman, both of Champaign, Ill.

[73] Assignee: Teepak, Inc., Oak Brook, Ill.

[21] Appl. No.: 25,454

[22] Filed: Mar. 13, 1987

[51] Int. Cl.$^4$ ............................................. A22C 13/00
[52] U.S. Cl. .................................................. 138/118.1
[58] Field of Search ...................... 106/168, 186, 203; 138/118.1; 426/105, 135, 138

[56] References Cited

U.S. PATENT DOCUMENTS

| | | | |
|---|---|---|---|
| 1,771,461 | 6/1930 | Lilienfeld | 106/203 |
| 2,129,708 | 9/1938 | Schreiber | 106/203 |
| 2,134,825 | 11/1938 | Hill et al. | 536/30 |
| 3,454,982 | 7/1969 | Arnold | 17/42 |
| 3,456,286 | 7/1969 | Martinek | 17/49 |
| 4,163,463 | 8/1979 | O'Brien, Jr. | 138/118.1 |
| 4,198,325 | 4/1980 | Hammer et al. | 138/118.1 X |
| 4,390,490 | 6/1983 | Martinek et al. | 264/173 |
| 4,404,369 | 9/1983 | Huttunen et al. | 536/30 |
| 4,526,620 | 7/1985 | Selin et al. | 106/203 |
| 4,530,999 | 7/1985 | Selin et al. | 536/30 |

FOREIGN PATENT DOCUMENTS 0178292 4/1986 European Pat. Off.

*Primary Examiner*—Mark J. Thronson
*Attorney, Agent, or Firm*—Michael L. Dunn

[57] ABSTRACT

A tubular film sausage casing comprising a cellulose aminomethanate wherein from 0.5 to 30 numerical percent of the cellulose hydroxy groups have been substituted with aminomethanate groups. The casing may be crosslinked or may be fiber reinforced.

29 Claims, No Drawings

CELLULOSE AMINOMETHANATE SAUSAGE CASINGS

BACKGROUND OF THE INVENTION (a) Field of the Invention

This invention relates to cellulose based products and more particularly relates to viscose type products which can be formed into sausage casings.

(b) History of the Prior Art

Viscose has been used for an extended period of time in the manufacture of regenerated cellulose sausage casings. The viscose, dissolved modified cellulose, which has been commercially used in the prior art has almost universally been formed by treating cellulose with caustic soda and carbon disulfide to form cellulose xanthate which is then dissolved in weak caustic solution to form the viscose. The products formed from cellulose regenerated from this viscose have found great commercial success. Unfortunately, the carbon disulfide used in the process and by-product carbon disulfide and hydrogen sulfide from the process are flammable and extremely toxic and these products must be carefully managed. Such management is made more complex when the material is a tubular material such as a sausage casing which can conduct gaseous products.

In addition, in the traditional viscose process for the manufacture of sausage casings, regeneration of the cellulose is necessary. Furthermore, the resulting cellulose product does not lend itself to internal plasticization and requires some kind of plasticizer for handling. In the absence of some kind of plasticizer the product is brittle.

A viable alternate to the traditional viscose process for the manufacture of sausage casings would therefore be desirable.

As clearly as 1930 (U.S. Pat. No. 1,771,461) it was proposed that ammonia derivatives of carbon dioxide such as urea, could be reacted with cellulose to form soluble products which could subsequently be used for the manufacture of fibers and films. This process was further discussed in U.S. Pat. Nos. 2,129,708 (1938) and 2,134,825 (1938) assigned on their faces to E. I. du Pont. The viscose type products resulting from this process are esters which will be referred to herein as cellulose aminomethanates, although they may also be known as cellulose amino formates or cellulose carbamates in other references.

While the resulting final products, e.g. fibers and films, at least when made on a small scale, had fair properties, the properties, especially purity strength and solubility at comparable chain lengths, were not nearly as good as similar products made from conventional viscose, i.e. the xanthate process. Recently, in part due to increased awareness of our environment, interest has again been shown in the alternate viscose technology disclosed in the above early references. It has, for example, been disclosed in U.S. Pat. No. 4,404,369 issued in 1983, that an alkali-soluble cellulose derivative could be produced by treating cellulose with liquid ammonia having urea dissolved therein. The object was to develop a product having urea distributed through the product prior to reaction by heating. The process described nevertheless has problems in that liquid ammonia also must be contained and in addition the product still does not have properties as good as desired for many commercial applications.

Various proposals have been made for increasing solubility of the cellulose aminomethanate product, e.g. U.S. Pat. No. 4,526,620 wherein excess urea is used to increase solubility but simultaneously creates urea contamination and U.S. Pat. No. 4,530,999 where the chain length is reduced by radiation which unfortunately also decreases end product strength.

It was proposed in European Patent Publication No. 178,292 published Apr. 16, 1986, that an improved product could be obtained when an alkali-urea impregnated cellulose was washed with urea solution to remove hydroxide prior to heating to form the ester. While this provided some improvement in the properties of the resulting ester, uniformity and thus strength especially when large quantities of products were made, are still not as good as desired to permit substitution for most xanthate type viscose in most commercial applications.

BRIEF DESCRIPTION OF THE INVENTION

It has now been unexpectedly found, that despite its shortcomings in the prior art, cellulose aminomethanate type viscose is particularly suitable for use in the manufacture of cellulose type sausage casings. When manufacturing parameters are properly controlled, the use of cellulose aminomethanate type viscose has a surprising number of good properties in common with xanthate viscose. In particular, it has now been unexpectedly found that water uptake by the coagulated product could be unexpectedly low compared to other cellulose ethers and esters having a comparable degree of substitution and of the order of such uptake by products made from xanthate viscose. Furthermore, coagulation rates and coagulation bath components can be similar to xanthate viscose.

In addition, it was unexpectedly found that the cellulose aminomethanate viscose can be coagulated to form a good film product with regeneration of the cellulose and that the retained aminomethanate groups act as internal plasticizers thus reducing the requirement for as much added plasticizers as in conjunction with sausage casings made from xanthate viscose. It has further been found that such films, if initially formed in flat rather than tubular form, can readily be made into tubes.

Furthermore, it has been found that fiber reinforced sausage casing products made from the aminomethanate viscose can have strength properties comparable to similar products made from xanthate viscose.

It has also been found that, if desirable, the strength of sausage casings made from aminomethanate viscose can be further enhanced by introducing crosslinking or by otherwise increasing polymer size.

All of the above advantages are unexpectedly obtained through the use of cellulose aminomethanate viscose to manufacture sausage casings in addition to the advantage of elimination of undesirable $CS_2$ and $H_2S$ products associated with the cellulose xanthate viscose process.

In particular, the invention is a tubular film food, e.g. sausage, casing comprising a cellulose aminomethanate wherein from 0.5 to 30 numerical percent and preferably from 2 to 15 numerical percent of the cellulose hydroxy groups have been substituted with aminomethanate groups. Desirably, the average degree of polymerization (DP) of the cellulose is from 300 to 650 combined glucose units. If desired, the cellulose aminomethanate polymer may be at least partially regenerated. The sausage casing primary gel after coagulation desirably only contains from about 300 to about 500 percent water by weight of cellulose aminomethanate.

The polymeric cellulose aminomethanate may optionally be fiber reinforced or may be crosslinked wherein a crosslinking agent is reacted to connect at least two of the cellulose hydroxy groups, at least two of the aminomethanate groups or at least one hydroxy group with at least one aminomethanate groups. Desirably, there are between 0.1 and 10 crosslinks per 100 glucose units in the cellulose when crosslinking is used. The finished sausage casing product may be provided in the form of a shirred sausage casing or in the form of reelstock.

DETAILED DESCRIPTION OF THE INVENTION

The tubular film sausage casing comprises a polymeric cellulose aminomethanate which may or may not be partially regenerated.

Cellulose which is aminomethanated in accordance with the present invention may be represented by the formula:

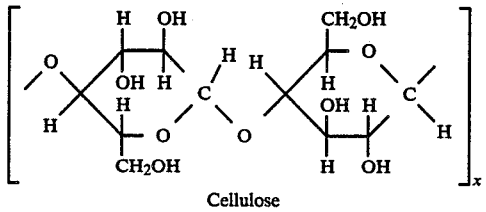

Cellulose

One half of this formula, i.e.

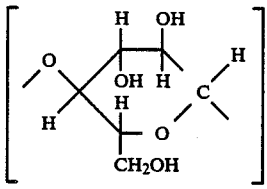

whether a dehydro derivative or whether or not is substituted at an —OH position is referred to herein as a glucose unit. The average degree of polymerization of a cellulose (DP), whether or not it is aminomethanated at a hydroxy position, is the average number of combined glucose units. The preferred average degree of polymerization is from 300 to 650. The average of polymerization can be expressed as $DP_W$ which is the weight average DP or by $DP_V$ which is determined by calculation from a viscosity determination and correlates with $DP_W$.

The cellulose aminomethanate is formed by reaction of cellulose with certain amine oxygen containing compounds such as urea or biuret.

It is believed that cellulose is aminomethanated in accordance with the basic formula:

The isocyanic acid is believed to be generated at the time of reaction from urea or cyanuric acid or a similar compound, e.g.

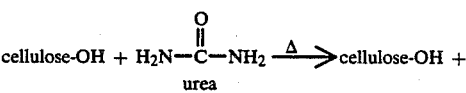

The urea may be carried into the cellulose structure by a suitable carrier such as liquid ammonia to more uniformly distribute the urea throughout the cellulose structure, as for example is described in U.S. Pat. No. 4,404,369.

The polymeric cellulose aminomethanate utilized in accordance with the invention to form the tubular film sausage casing desirably has from 0.5 to 30 numerical percent of the cellulose hydroxy groups substituted with aminomethanate groups and preferably has from 2 to 15 numerical percent of the cellulose hydroxy groups substituted. Prior to formation of the sausage casing, the polymeric cellulose aminomethanate desirably contains from about 3 to 30 numerical percent and preferably from about 5 to about 20 numerical percent of the cellulose hydroxy groups substituted with aminomethanate groups.

This structure permits the cellulose aminomethanate to be dissolved and handled in a manner similar to traditional viscose. A tubular film sausage casing may then be extruded by known means and coagulated in a manner similar to traditional viscose coagulation. The coagulated tubular film may be regenerated with a hot dilute concentration of sodium hydroxide.

More particularly, the cellulose aminomethanate having at least 3 numerical percent of the cellulose hydroxy groups substituted and preferably at least 5 numerical percent of the cellulose hydroxy groups substituted may be dissolved in from about 6 to 10 percent sodium hydroxide solution at about −5° C. The quantity of cellulose aminomethanate which can be dissolved in such a solution depends largely upon the average degree of polymerization of the cellulose and upon the degree of substitution (DS) of the hydroxy groups with aminomethanate groups as well as upon temperature. Desirable, from 6 to 10 percent of the polymeric cellulose aminomethanate can be dissolved by slurrying into a 6 to 10 percent sodium hydroxide solution at 15° C. followed by cooling to subzero temperatures, e.g. less than about −4° C. The reduced temperature will cause the cellulose aminomethanate to dissolve. After solution the temperature may again be permitted to rise up to 10° C. or higher.

The tubular film may be coagulated in baths similar to the baths used to coagulate traditional xanthate viscose. The bath may, for example, contain a mixture of sodium sulphate and sulfuric acid. An example of such a bath might contain from about 200 to 300 grams per liter of sodium sulphate and from about 100 to 200 grams per liter of sulfuric acid. After coagulation, the tube is neutralized with acid.

Very surprisingly, the aminomethanate viscose after coagulation and washing retains a low percentage of water in the primary gel when compared with other ether-type modified cellulose compositions. The quantity of water retained is very surprisingly similar to the quantity of water retained by traditional xanthate viscose after coagulation. The quantity of water contained may be as low as from between about 300 to about 500 percent water by weight of cellulose aminomethanate which is significantly lower than other coagulated ether type or ester type derivatives of cellulose. "Primary gel" as used herein means the coagulated and washed cellulose aminomethanate prior to initial drying.

The tubular film may then be dried and if desired, regenerated in a dilute caustic soda solution, e.g. 1-2 percent NaOH at from 80° to 100° C. for from about 5 to about 20 minutes. Such a finished regenerated casing may contain as few as 0.5 numerical percent or less of the cellulose hydroxy groups substituted with aminomethanate groups.

It has further been unexpectedly found that the sausage casing film can be formed from cellulose aminomethanate polymer, as previously described, which is fiber reinforced and which has characteristics comparable to fiber reinforced xanthate viscose films. The reinforcing fiber may be any suitable fiber such as fibers made from organic polymers and even inorganic fibers such as fiberglass. In general, however, it is most desirable that the fiber be physiologically compatible and is therefore most usually a cellulose fiber both for reasons of physiological compatibility and cost. The fibers may be blended with the cellulose aminomethanate polymer prior to formation of the sausage casing or alternatively and preferably the cellulose aminomethanate may be extruded into a fiber web which is being formed into a sausage casing. The fiber web may be either a felted or woven type web. In general, the web is a cellulose fiber paper and the casing comprises such a paper impregnated with said cellulose aminomethanate.

The methods for impregnating such a paper are well known to those skilled in the art and in general follow the procedures previously used for cellulose xanthate type viscose. A description of such procedures may be found, for example, in U.S. Pat. No. 4,390,490.

It has further been found in accordance with the present invention that sausage casings having increased tensile strength can be obtained by means of crosslinking. In particular, the cellulose aminomethanate in a sausage casing may comprise a plurality of crosslinks wherein each of the crosslinks are formed by a crosslinking agent reacted to connect at least two of the cellulose hydroxy groups, at least two of the aminomethanate groups or at least one hydroxy group or at least one aminomethanate group. A crosslinking agent may be any effectively difunctional compound which will react with aminomethanate or hydroxy groups in the cellulose aminomethanate polymer.

The number of crosslinks in the cellulose aminomethanate polymer sausage casing preferably ranges between about 0.1 and 10 crosslinks per 100 glucose units in the cellulose. A crosslinking agent may be any effectively polyfunctional compound which will react with aminomethanate or hydroxy groups in the cellulose aminomethanate polymer. A crosslinking agent may, for example, therefore be selected from the group consisting of polyfunctional compounds containing at least two groups selected from aldehyde, amine, carboxy, alkylhalide, acidhalide, methylol, carboxylic anhydride and isocyanate groups. Especially desirable crosslinking agents are long chain crosslinking agents, which have been found to increase strength while minimizing embrittlement, which are potentially physiologically acceptable even though they are reacted into the system which prevents physiological absorption. Examples of preferred crosslinking agents therefore, for example, include glutaraldehyde and melamine formaldehyde type resins which contain a high methylol content to provide the reactive crosslinking groups.

"Long chain" as used herein means that the crosslinking agent contains at least 5 and preferably more atoms in the molecular chain between the reaction sites.

It should be noted that crosslinking of prior art regenerated cellulose from xanthate viscose for sausage casing, has been unsuccessful since the product usually comprises an impractically brittle film which in many cases has reduced, rather than increased tensile strength. The increased embrittlement or decreased elongation at break resulted in poor toughness and was unsuitable for use as a packaging or casing film.

It has been unexpectedly found that sausage casings made from cellulose aminomethanate polymer as described herein is not as subject to embrittlement by crosslinking as is traditional xanthate viscose. While not wishing to be bound by any particularly theory, it is believed that since the cellulose aminomethanate has a low density of very uniformly spaced aminomethanate group, the crosslinkage is not as detrimental to the elongation at break as is the case with conventional regenerated cellulose film. This effect is even further reduced when long chain crosslinkers are used as is previously described.

The use of glutaraldehyde, which was freshly diluted and used within a few hours of solution, suggests that a substantial increase in burst strength of the cellulose aminomethanate film can be obtained while retaining sufficient elongation at break. While there is some reduction in elongation at break and this reduction is not desirable, such reduction of elongation at break was tolerable and to a degree dramatically less than has been previously experienced in previous research on crosslinking traditional xanthate viscose cellulose casing.

It has been further unexpectedly discovered that if a low percentage of along chain crosslinker such as glutaraldehyde is used, very large increases in tensile strength and burst strength of the resulting sausage casing film can be obtained with tolerable reductions in break elongation. Such a low loading or percentage of crosslinking agent can for example be obtained by steeping the gelled aminomethanate film in acidic solutions of 2,500 to 5,000 parts per million of glutaraldehyde or 2,500 to 5,000 parts per million of high methylol content melamine formaldehyde. In particularly sensitive systems, other conditions may be used, e.g. even lower concentrations of crosslinkers, longer chain crosslinkers and different reaction conditions.

The cellulose aminomethanate polymer sausage casings of the present invention can be handled and packaged in a manner similar to traditional xanthate viscose regenerated cellulose sausage casings. Such sausage casings can, for example, be provided as reelstock or can be shirred and sold as shirred sticks. Methods for forming such shirred sausage casings are well known to those skilled in the art as, for example, is taught in U.S. Pat. Nos. 3,454,982 and 3,456,286.

The following examples serve to illustrate and not limit the present invention.

Various cellulose aminomethanates were prepared substantially in accordance with the teachings of U.S. Pat. No. 4,404,369. Cellulose pulp was saturated with urea dissolved in liquid ammonia, the ammonia was evaporated and the fibers containing 50 to 100% urea on the fiber weight were heated to 165° to 175° C. for periods of one to three hours. The resulting product was then extracted with hot water to remove excess urea and biuret to obtain a 0.06 to 0.25 DS cellulose aminomethanate which will readily dissolve in 8 to 10% −5° C. sodium hydroxide. DS as used in these examples means the number of —OH groups substituted per glucose unit divided by three (available —OH groups). Numerous such preparations were made.

In particular examples, various preparations were made using cellulose pulp regenerated from alkali cellulose. Details of some of such proportions are as set forth in the following examples.

EXAMPLE I 220 g of cellulose which had been derived from a neutralized alkali cellulose (AC) crumb was used. The alkali cellulose crumb was made from a 1500 $DP_w$ prehydrolized sulfate dissolving wood pulp which had been steeped, mercerized, shredded and aged at 28° C. for 33 hours.

220 g of this aged AC crumb fluff was immersed in a dilute soluton of urea in liquid ammonia at about a 1-10 liquor ratio for 2 hours near the boiling point of the liquid ammonia. The resulting pulp was then pressed with removal of the liquid ammonia by tumbling the material at slow tumbling rate in a cylinder sparged with dry air to assist in removal of the liquid ammonia. The tumbling was continued 2½ hours to give 370 g of the urea impregnated cellulose which had approximately 44% load of urea based on the weight of the cellulose.

Several portions of the urea impregnated cellulose were converted into 50 g disks of density of about 0.7-0.8 g per cc by loading a 7 oz. pan of aluminum with the 50 g of pulp, placing an aluminum foil over the assembly and then pressing in a pellet press with wood blocks at a 20,000 lb. load on the ram to give a disk approximately ¼" thick.

The disks were placed in a stainless steel tray and heated in an oven at 105° C. for preheating the disks to near 105° C. temperature. The disks were then rapidly introduced into an oven set at 202° c. which dropped the air temperature to 192° C. The disks were then cured for 15 minutes with the higher temperature rising to about 200° C. in 9 minutes. The resulting disks then broken up and washed in hot water and tested for solubility in cold 8% sodium hydroxide solution.

A 6% dope of the disk-cured cellulose aminomethanate was made in the usual manner by adding the solid to precooled −5°C. 8% sodium hydroxide contained in a beaker with a laboratory high shear mixer and dissolving the material over a period of about 2 hours. A clear solution arose. The 400 g of 6% dope was then centrifuged 1 hour at about 2700 rpm to remove air and any traces of fiber fragment. This particular dope was stored in a refrigerator at 60° C. for approximately 24 hours prior to use to make films which, in turn, were used for subsequent cross-linking experiments.

EXAMPLE II

A 33 hour aged AC crumb derived cellulose as previously described was used as a starting material. Approximately 150 grams of urea was dissolved in 5500 ml of liquid ammonia at −49° C. and warmed to about −43° C. The solution was used for saturating approximately 400 g of the pulp "as is" by adding the pulp in portions to the solution and pressing with a spatula to impregnate the pulp completely as it was added. The pulp was furthermore pressed 3 times within the next 45 minutes to assist in uniformity of impregnation. The steeping time was 45 minutes before the solution was decanted. The solution showed approximately 3% concentration of urea at this point. The urea-impregnated pulp was tumbled at room temperature with a 2 psi dry air sparge through the tumbler to aid escape of ammonia. A 535 g yield of the dry material at room temperature was obtained. The urea loading was approximately 36% based on the weight of the cellulose.

Approximately 150 g of this 36% addon urea cellulose was placed in stainless steel shallow tray and pressed with the hands to approximately ½" thickness. The contents of the tray were preheated for 1 hour in a 105° C. oven and then quickly placed in a laboratory oven placed at 200° C. and allowed to cure for 13 minutes. Large amounts of ammonia were evolved.

The crude product weighed approximately 141 g and was washed in hot water and dried before use in making the cellulose aminomethanate dope.

A 6% dope of the resulting 350 $DP_\gamma$ aminomethanate was made by dispersing at −5° C., in 8% caustic and stirring with a high shear laboratory mixer for 2 hours at temperatures from −5° to 0° C. The dope was then centrifuged for 1 hour in a high speed laboratory centrifuge and was used without subsequent aging for making the 22 ml drawdown-derived gel films of Example VI.

EXAMPLE III

Example II was essentially repeated to obtain a 38% addon urea cellulose. The approximately 38% loaded urea cellulose was cured in separate curing batches at 50 g per batch. The 50 g was pressed out as a uniform layer in a 5"×8" stainless steel tray and preheated to 105° C. for 1 hour prior to cure. The tray and contents were then placed in a 200° C. set laboratory oven and allowed to cure for 12 minutes. A second batch was treated similarly and a third batch at 75 g was also cured for 12 minutes. The three batches were composited to make material for use in the preparation of 7% dope.

The dope was made by adding the 28 g of the polymer to 372 g of 8% caustic initially at −8° C. Very fast dissolution took place under laboratory mixing. The stirring was done for 1 hour with a final temperature of 6° C. because of the heat of stirring. The clear dope was centrifuged at 3000 rpm in a Beckman TJ6 laboratory centrifuge to remove air prior to dope casting.

EXAMPLE IV

Cellulose aminomethanate was also made substantially by the procedures taught in U.S. Pat. Nos. 2,129,708 and 2,134,825 and in European Patent Publication No. 178,292 except that aqueous ammonia was used.

Forty grams of urea is blended with 200 ml 28-30% aqueous ammonia and 3.6 grams of cellulose pulp. The swelled mixture is shaken for 30 minutes and filtered and pressed. The resulting pad weighed 11.2 grams including residual water and weighed 4.92 grams after drying overnight at 80° C. (in a vacuum). The dry pad was calculated to have a 37 weight percent urea add on. The dried pad was then heated to between 160° and 180° for about two hours. The resulting cured cellulose aminomethanate pad was soaked in ice water, macerated in a high shear blender, and filtered. The filtered material was then dissolved in −2° C. NaOH (9%) containing 1% ZnO. The resulting viscous solution was centrifuged and cast into a film, coagulated, washed and dried. An IR spectra confirmed the presence of the aminomethanate group.

Similar results are obtained when NaOH solution is used instead of aqueous amonium hydroxide.

EXAMPLE V

Six percent of cellulose aminomethanate prepared as in Example I was dissolved in dilute caustic solution and drawn into a 26 g/m², 22 mil thick film. The resulting film was coagulated in a bath containing 140 g/l $H_2SO_4$ and 240 g/l $Na_2SO_4$ for 6 minutes at 28° C. The coagulated film was then washed. The film was then treated with a 2500 ppm glutaraldehyde, 0.2% malic acid solution, pH 2.8 crosslinking solution for 5 minutes. The film was then cured at 145° C. for 7 minutes. The resulting film has an average burst strength of 14.7 psi as compared with an 11.1 psi burst strength for the same film which is not treated with the crosslinking glutaraldehyde solution. The crosslinking resulted in a 32% average increase in burst strength. The film can be readily formed into a seamed tube which can be stuffed with meat using a 69% $ZnCl_2$ solution to adhere the seam. The resulting seam is strong and contiguous.

EXAMPLE VI

Example V was repeated except that cellulose aminomethanate prepared essentially in accordance with Example II was used and a better solution was obtained. The film had an average burst strength of 14.7 psi as compared with 10.0 psi for the same uncrosslinked film representing a 47% increase in average burst strength. The film can readily be formed into a seamed tube using a 69% $ZnCl_2$ solution to adhere the seam. The resulting tube can be stuffed with meat.

EXAMPLE VII

Example V was repeated except that a 7% solution of cellulose aminomethanate prepared substantially in accordance with Example III was formed and drawn into a 34 g/m² film. Additionally, 5000 ppm glutaraldehyde was used in the crosslinking solution. The resulting film had a 21.2 psi average burst strength when compared with a 13.0 psi burst strength for the same uncrosslinked film. This represents a 63% increase in burst strength. The film could readily be rolled and formed into a seamed sausage casing using 69% $ZnCl_2$ solution to form the seam.

EXAMPLE VIII

Example VII was repeated except that a much thinner 18 g/m² film was formed. The average burst strength was 15.8 psi when compared with only 9.5 psi for the same uncrosslinked film.

EXAMPLE IX

The above films showed an increase in rewet burst strength but a reduction in conditioned tensile strength. It was, however, found that when proper conditions were selected an increase in tensile strength could also be obtained especially the tensile strength of rewetted film.

A 7% solution of 1.7% N content 550 DP cellulose aminomethanate was prepared in 8% NaOH. The solution was centrifuged at 1200 g for 1½ hours. 30 mil drawdowns gave 41–45 g/m² films which were coagulated for 8 minutes in a 28° C. solution of 17% ammonium sulfate −5% sulfuric acid solution. The films were then water washed. A film was steeped in aged 2500 ppm glutaraldehyde solution at pH 2.8 for 10 minutes and cured at 135° C. for 7 minutes. The resulting film had a tensile break at 12,270 psi dry and 3,315 psi wet as compared with the same uncrosslinked film at 9,870 psi dry and 1,390 psi wet.

EXAMPLE X

Example IX was essentially repeated except that high methylol melamine-formaldehyde (MF) was used for crosslinking in a 5000 ppm MF, 1000 ppm malic acid crosslinking solution. The film was steeped in the solution for 10 minutes at 25° C. and cured for 7 minutes at 135° C. The resulting film had a dry break at 10,140 psi as compared with 9,869 psi for the uncrosslinked control and a wet break at 2,607 psi as compared with 1,391 psi for the uncrosslinked control.

EXAMPLE XI

Example X was repeated except that 2500 ppm of MF was used. The dry tensile strength was 12,803 psi and the wet tensile strength was 1,748 psi.

EXAMPLE XII

Example I is substantially repeated except a 699 DP cellulose pulse (determined by viscosity test) aged as alkali treated cellulose crumb 16 hours at 28° C. was used. 60 grams of the pulp was steeped in a solution of 60 grams of urea in liquid ammonia at −40° C. for 2 hours. The excess is pressed from the steeped pulp and the treated pulp is tumbled for 15 minutes. Excess ammonia is allowed to evaporate for 18 hours. The resulting product is found to have a 58% urea add on. 50 grams of the product is cured and heated to between 185° and 190° C. for 15 minutes.

A 5% dope is dissolved in 8% caustic at −5° C. to 6° C. The product is then centrifuged for 2 hours. A paper web is then impregnated with the liquid product and the product is coagulated as previously described. The impregnated web is then dried at 100°–105° C. for 10 minutes. The reinforced product is found to have properties similar to the fiber reinforced xanthate viscose products traditionally used in the prior art.

EXAMPLE XIII

A prehydrolized dissolving high α sulfate pulp of 1500 $DP_W$ (Buckeye V-5) was steeped in normal steeping caustic at room temperature and shredded and without aging was neutralized and acetic acid washed and dried at low temperature. Resulting crumb derived cellulose from a wood pulp dissolving pulp had a $DP_V$ of 957. This material was used as a starting material for cellulose aminomethanate synthesis. 53 g "as is" of the crumb was placed in a 7 cm diameter large mesh wire basket and very lightly packed for immersion into the liquid ammonia solution of urea. The basket was inserted into a mixture of 1650 ml of liquid ammonia plus 90 g of urea at −45° C. The temperature went up because of the heat capacity of the cellulose. The cellulose was allowed to steep in this liquid for 30 minutes with occasional light pressing with a spatula to give good contact between liquid ammonia solution and the cellulose. The basket was removed and manually pressed lightly and then the excess liquid ammonia was evaporated under aspirator vaccum with a 60° C. water bath for 2 hours and then the resulting urea impregnated cellulose removed from the basket, placed in shallow trays and allowed to evaporate in a hood over night at room temperature. The resulting urea cellulose gained approximately 33.6% of its weight with urea. It was a white crumb like material.

The 70.8 g of the urea impregnated cellulose was layered into two stainless steel trays at approximately 2-3 mm layer of material. Placed quickly into a laboratory oven initially at 200° C. The oven cooled to approximately 177° C. as a result of the introduction of the sample and the sample was allowed to cure for 15 minutes. The oven increased to 186° C. at the end of the cure. The resulting high DP cellulose aminomethanate had a very light but a very uniform tan color after cure. The crude material weighed 63.2 g after cure and after hot water washing weighed 47.2 g. The resulting cellulose aminomethanate had a nitrogen content of about 1.4% and a $DP_V$ of 545.

Because of the high molecular weight of the cellulose aminomethanate, a 4% solution of the material was made in $-5°$ C., 8% sodium hydroxide solution. The solution was made by rapidly introducing the high DP cellulose aminomethanate into the cooled dope and immediately dissolution was noted to occur with the dope increasing in viscosity very rapidly. The dope was stirred with a high shear laboratory mixer for 1 hour. The 300 g batch was then centrifuged to remove air and a small amount of undissolved fibers.

The resulting dope was a very light and viscous dope which was suitable for purposes of hand casting the dope into film. The 4% solution of polymer was beaded onto a plate glass plate and 30 ml draw down done with hand cast drawbar. The resulting dope layer as converted to a cellulose aminomethanate film by introducing the plate and liquid film into a typical Muller type coagulation and neutralization bath. The bath was held at 25° C. It contained approximately 140 g per liter of sulfuric acid and about 250 g of sodium sulfate. It was noted the films coagulated within B 3-5 seconds and were allowed to remain in the bath for 5 minutes to assure complete precipitation of the primary gel from the dilute polymer dope. The transparent, clear, almost colorless tough gel film was removed after it had floated from the plate in about 1 minute. It was removed from the bath, washed in tap water and then washed in deionized water briefly to remove traces of salts from the tap water. The films were dried on nylon hoops at room temperature to give clear, tough films. The films had a thickness in the 80% conditioned relative humidity (RH) state of approximately 0.8 Mil. The resulting films showed a 80% RH conditioned tensile of about 5500 psi at a elongation break of about 70%. The rewet tensile was approximately 1230 with a rewet thickness of approximately 1.4 Mil. The elongation at break rewet was about 30.7%.

It is known that the use of a dilute dope solution in hand casting gives rise to poorer films then the use of a more concentrated solution under otherwise similar conditions of film casting. The viscosity of the dope required a low polymer concentration for simple hand casting procedures. However, with different equipment a somewhat larger dope concentration could be managed.

When the centrifugation time of the 4% dope was extended to 3 hours at 2700 rpm, the break tensile at 80% RH increased to 6685 psi, break elongation was 13%, and break force was 6.89 lb/inch. A 3% dope gave rise to a 0.5 ml thick final film, which had a break tensile of 7515, a 12.9% elongation at break and a 3.98 lb/inch break force. The additional centrifugation did improve the tensile strength. Visually, the more centrifuged dope was clear. The material appeared to be quite tough, even without the use of a conventional plasticizer.

EXAMPLE XIV

A high quality 96.5% alpha content 635 $DP_W$ dissolving wood pulp was used as starting material.

A batch of 450 g of the dissolving pulp was fluffed to make it more accessible, was added to 5.8 liters of liquid ammonia plus 214 g of urea contained in Dewar flask at approximately $-40°$ C. The fluffed material was compressed periodically during the 2 hour steep and manually squeezed and drained to remove 705 g or 950 ml of the liquid ammonia solution.

The batch was then placed in a rotating polyethylene drum of about 20" diameter for tumbling during the evaporation of the liquid ammonia. The tumbling required about 3 hours to get to a 624 g net weight for the resulting urea-impregnated cellulose which then contained approximately 38% addon to the cellulose. The material had 6% volatiles defined as that which is volatile at 110° C. for 3 hours drying time for the sample.

The above and similar batches were accumulated to do a large scale curing of this low addon, low DP cellulose material to form a low DP cellulose aminomethanate suitable for use as an impregnating liquid for a hemp fiber reinforced film.

The resulting 1160 g of the urea impregnated cellulose, containing 35-36% urea addon, were placed in stainless steel trays in approximately a 5 cm thick layer at a pack density of about 0.12 g per cc. A thermo-couple was inserted into the midpoint of the thickness of one of the trays and the tray placed in a large laboratory oven for cure. The trays were placed in the oven initially set at about 130° C. and the oven went to about 110° C. as the trays were placed in it. The oven temperature was then rapidly raised while the temperature of the midpoint of the probe in the pad was followed and the oven raised at a level to permit no higher than 40° C. differential in temperature between the oven and midpad temperature for any midpad temperature in excess of 120° C. A midpad temperature of 120°-158° C. the average temperature differential was 40° C. The total cure time was 43 minutes for the batch. The batch was then removed and exhibited a light tan color which was uniform throughout the thickness of the 5 cm pads.

The resulting aminomethanate was washed in hot water to remove by-product materials and dried at low temperatures to approximately 3% moisture. Approximately 845 g of pure cellulose aminomethanate with a nitrogen content of 1.24% resulted. This material when dissolved in 8% caustic at 8% polymer concentration showed a ball fall of viscosity of approximately 17 seconds. This viscosity is suitable for a dope to be used in impregnation of a reinforcing web to make reinforced casing material. The 7% dope centrifuged at 2700 rpm for 1 hour showed no obvious residue of fibrous at the bottom and was air free from the centrifuging process.

An 8 Kg batch of 7% aminomethanate solution was made in 8% sodium hydroxide using a jacketed planetary laboratory mixer. The aminomethanate was added to the port of the mixer which had in it a mix of 4932 g ice and 2480 g of 25% cooled sodium hydroxide solution. The temperature of the dispersion of aminomethanate was initially $-6°$ C. The mixing was continued near full speed for about 1½ hours with the temperature allowed to rise gradually to 0° C. The dope was then filtered at 50 psi through a 100 micron filter. A yield of about 7.2 k of filtered dope was obtained, the remainder being the mechanical loss in the pressure feeding device and in the void space of the filter casing.

The resulting filtered dope was placed in a 4° C. refrigerator and the dope was drawdown with 30 mil drawdown and 22 mil draw-down blades for the manufacture of abaca web reinforced films.

At 20° C. the material was drawn down on a glass plate and a 12½ basis weight abaca web was immediately placed on the drawdown liquid and allowed to saturate with the liquid for 1 minute. The web was rapidly saturated with the aminomethanate dope and the resulting plate and attached film was then placed in a modified fibrous casing coagulating bath for 10 minutes at 20° C. This was enough time for coagulation and neutralization for the caustic in the bath. The resulting reinforced cellulose aminomethanate films were then washed in hot tap water until free of acid. The coagulation liquid contained about 8% ammonium sulfate about 12% sodium sulfate and 6% sulfuric acid. The resulting reinforced gel films were dried on hoops for 10 minutes at 135° C.

The product showed a rewet tensile strength of 3144 psi and an elongation at break of 69% at 30 mil and 3038 psi tensile and 59.8% elongation at 22 mil.

Crosslinking with glutaraldehyde at high concentrations, i.e. 2500 or 5000 ppm was not effective to improve the properties of these reinforced films. It is, however, believed that improved properties can be obtained under different conditions, e.g. long chain or polymeric crosslinkers, different concentrations and different reaction conditions

EXAMPLE XV

A pilot run was made using approximately 12 gallons of 6% cellulose aminomethanate dope that had been filtered through a 60 micron 200 in² filter and had also been deaired. The size 1 casing run was done at normal commercial running rate of 30 ft per minute.

The 12 gallons were made up of 5 separate aminomethanate preparations which were slightly different in composition and DP. These are described as follows:

The first 4.5 gallon batch, 6% aminomethanate dope was made from an aminomethanate synthesized from $DP_w$ 660, 93.4 $\alpha$, dissolving pulp (Buckeye V-65) that had been stepped in dilute urea solution and liquid ammonia for 2 hours to build a 45% load of urea based on the weight of the cellulose. The steeping was done at 1:10 ratio, excess liquid poured off, the pulp fluff slightly squeezed, and then tumbled for about 2½ hours in a horizontal tumbling device with a 2 psi air flow through the sparging device to aid in evaporation of ammonia at near or below room temperature. The resulting white fluffy material was then converted to the cellulose aminomethanate by use of 2–3 cm layers of the compacted material placed in stainless steel trays and cured in a laboratory vacuum oven.

The oven was set at 156° C. and the stainless steel trays with the urea cellulose pads were introduced which dropped temperature to 130° C. Curing was continued at 23" mercury vacuum from an aspirator with a small air stream flowing through the oven both to sweep ammonia away and to aid in heat transfer. The curing was continued for 2½ hours with the air temperature near the 155° C. for 2 hours of that period. The resulting cured crude cellulose aminomethanate was light tan in color and was washed in hot water extensively to remove by products and dried at low temperatures to avoid hornification, i.e., undesirable film surface densification.

A 7% solution in −5° C., 8% sodium hydroxide was a fairly dark brown, very clear solution. It was thus judged that this material would be suitable for the matrix in the fibrous casing run.

For dissolving, a jacketed insulated planetary mixing device of 4 gallons capacity was used with 900 g of pulp prewet with ice water prior to introduction into the mixer. The requisite amount of water in the form of ice, and sodium hydroxide in the form of 25% sodium hydroxide were previously introduced into the mixer and the mixer cooled to about −6° C. The ice water wet-pulp with the appropriate adjustment to give a 6% final polymer solution was introduced through a port and mixing continued at −5° to −2° C. for 2½ hours. The dope was deaired by application of a vacuum for the last hour of the dissolution. A clear viscous dope resulted which could be filtered through about a 210 square inch, 60 micron filter with approximately 1 hour required for filtration of the total batch.

The filtered and deaired, dope was maintained at approximately 0° C. for the succeeding day.

A second 4 gallon batch of 6% cellulose aminomethanate dope was made from a carbamate derived from about ⅔ of the 900 g of V-65 Buckeye pulp and ⅓ $DP_W$ 855–930, 94.6% $\alpha$ dissolving pulp (Buckeye V-60). The cellulose aminomethanate was synthesized in a vacuum oven starting out at about 10° C. more than the previous batch and with reaction time of 2½ hours. The material was washed and dried at low temperature prior to dissolution in the jacketed ross planetary mixer.

In this dissolution, the 900 g of bone dry aminomethanate was presoaked in 3600 g of ice water for ½ hour. The mixture of ice and sodium hydroxide in the mixer was set initially at −8° C. before addition of the cold wet aminomethanate. The mixer was operated at top speed of about 160 rpm for 2 hours and the contents observed to contain some particles. An additional one hour resulted in no particles at a temperature of 2° C. The batch appeared to be less viscous than the first batch and better quality. A 60 micron filter with approximately 210 square inch filter area was used for filtration. The filtration was accomplished after a one hour deairation of the batch during this dissolution process. The resulting filtered and deaired dope was retained for admixture with the remainder of the dope for the pilot run.

A third batch was made of 6% cellulose aminomethanate dope. In this case a mix of ⅓ Buckeye V-60 derived carbamate and ⅔ $DP_W$ 635, 95.5 $\alpha$ dissolving pulp (Buckeye V-68) derived aminomethanate was used. The aminomethanate had been made from cellulose with a load of about 45% urea and the curing of the urea impregnated cellulose to convert to cellulose aminomethanate was done under atmospheric pressure rather than in a vacuum oven. The curing was done in a relatively low air flow rate laboratory oven.

The urea cellulose was loaded into stainless steel trays at about 5 cm thickness with a density of about 0.13 g per cc. The oven was initially set at 140° C. with the trays at room temperature introduced into the oven cooling it to 125° C. The oven was gradually programmed to increase the temperature as the temperature of a thermo-couple set midway down in the pad increased in temperature. For temperature below 120° C. the temperature differential could be 70°–80° C. For temperatures above 120° C. the maximum temperature differential allowed was 60° C. The reaction was continued for a total of 75 minutes with the pad temperature at 162°–168° C. for the last 25 minutes.

The air temperature maximum was 200° C. and at 45 minute reaction time was reduced gradually to 170° C. to avoid continued escallation of the curing temperature. A very uniformly tan colored series of pads was gotten with a uniform color throughout the thickness of the 5 cm pad. The material was washed in hot city water at 50°–55° C., was pressed free of excess water and dried at 65°–70° C. to avoid hornification. This material was the starting material used in the preparation of the third batch of dope to be used in the pilot scale run.

The composited, filtered, deaired dopes had material with about a 1.4% nitrogen content based on the weight of the dry cellulose aminomethanate at the time it was introduced into a blow tank to feed the die of a fibrous casing pilot machine. The die used was a pressure-fed die wherein a 12½ pound basis weight per 2800 square feet abaca saturated tissue web was impregnated using a hydraulic wedge principle and an enclosed die which forced the liquid into the paper and did not depend on spontaneous capillarity to impregnate the web uniformly with the aminomethanate dope. The dope was fed to the machine at about 10° C. so was quite viscous.

The die was adjusted using a paper leader to avoid wastage of the very limited amount of cellulose carbamate dope. The coagulation bath was modified over that commonly used for cellulose fibrous casing and was run at 45° C.

The coagulation bath consisted of 142 g per liter sulfuric acid and 253 g per liter sodium sulfate initially. The pilot machine was run at 30 feet per minute and the time of contact of the extruded, impregnated paper with the coagulation bath was less than 10 seconds. It was noted during the start of the run that the cellulose carbamate 6% dope coagulated very rapidly, such that when the casing was pulled through the set of 8 wiper rods just above the coagulation tank, that no damage to the film seemed to occur. Some problems were encountered in making a ¼" lap seam initially, but subsequently casing was made wherein the seam held. The casing was washed with one tank past the regeneration tanks and with only three wash tanks prior to the normal position of the glycerine plasticizer tank. The casing was readily made to the flat width standards of 6.2 to 7.1 cm and part of it, approximately 200 feet, was passed through to the dryer. All the gel casing samples were retained so that links of the casing that had a good seam could be dried as 4 feet lengths in the laboratory high air velocity oven. The casing was almost colorless and it was noted that the fresh gel film just above the coagulation tank when soaked in water at about 1–10 liquor ratio had a pH of about 2.4. Clearly, even the 10 second coagulation time where the coagulation had access to both the inside and outside of the film, resulted in the neutralization of essentially all of the caustic in the 6% aminomethanate.

Since no gases were evolved, no problems in distortion of the gel casing during passage to the machine were noted. The osmotic water would be taken up, due to the salt in the film, but appeared to present no problems and a normal cut cycle was maintained during the approximately 45 minute production run. The resulting casing samples having a glycerol content to about 10% had a Mullen rewet of about 35 psi, whereas the gel had a Mullen of about 16 psi. This behavior was also fairly typical of hand cast aminomethanate fiber paper-reinforced films.

The casing had a bone dry gauge of approximately 85 g per 10 meters, which is somewhat lower than the 94 g 10 meters that would be typical of a size 1 cellulose based casing. However, the cellulose based casing would be made with 7.7% cellulose xanthate viscose, compared with 6% celluloe aminomethanate dope employed in the current pilot run.

The cellulose aminomethanate in the matrix casing expressed on a dry basis had a nitrogen content of 0.7% at the dry end of the dryer. This represents loss of 50% of the initial nitrogen content in the mixed dope batch during the first day storage and the handling of the dope at the casing process machine.

The loss in aminomethanate during storage and prior to extrusion is probably good because this reduces the alkali swellability of the film and thus gives a stronger film.

A sample of casing retained in the gel state after the pilot run showed a gel 16 psi average Mullen test; whereas the rewet casing showed a 31 psi Mullen. The somewhat lower Mullen strength than that for standard size 1 commercial xanthate viscose fibrous casing can be attributed to the lower bone dry gauge of this casing relative to commercial xanthate viscose size 1 casing.

A meat emulsion representing a commercially made meat material was used to stuff the size 1 casing to a circumference of 6" which is standard for this size casing. The cooking was done in a laboratory style oven with no RH control. The oven was initially set at 75° C. and the bolognas cooked for 135 minutes to internal temperature of 73° C. The cooked sausage looked normal.

To further test the casing, a length of casing was hand shirred on a mandrel without casing damage.

What is claimed is:

1. A tubular film sausage casing comprising a polymeric film of cellulose aminomethanate which is cellulose substituted with aminomethanate groups wherein from 0.5 to 30 numerical percent of hydroxy groups in the cellulose have been substituted with aminomethanate groups.

2. The sausage casing of claim 1 wherein from 2 to 15 numerical percent of the cellulose hydroxy groups have been substituted with aminomethanate groups.

3. The sausage casing of claim 1 wherein the average degree of polymerization of the cellulose is from 300 to 650 combined glucose units.

4. The sausage casing of claim 1 wherein the cellulose has been at least partially regenerated.

5. The sausage casing of claim 2 wherein the cellulose has been at least partially regenerated.

6. The sausage casing of claim 1 wherein prior to a drying step the casing comprises a primary gel containing from about 300 to about 500 percent water by weight of cellulose aminomethanate.

7. The sausage casing of claim 2 wherein prior to a drying step the casing comprises a primary gel containing from about 300 to about 500 percent water by weight of cellulose aminomethanate.

8. The sausage casing of claim 1 wherein the film is reinforced with fiber.

9. The sausage casing of claim 8 wherein the fiber is cellulose fiber.

10. The sausage casing of claim 8 wherein the casing comprises a cellulose fiber paper impregnated with said cellulose aminomethanate.

11. The cellulose casing of claim 2 wherein the casing comprises a cellulose fiber paper impregnated with said cellulose aminomethanate.

12. The cellulose casing of claim 3 wherein the casing comprises a cellulose fiber paper impregnated with said cellulose aminomethanate.

13. The sausage casing of claim 1 which further comprises a plurality of crosslinks wherein each of the crosslinks are formed by a crosslinking agent reacted to connect at least two of the cellulose hydroxy groups, at least two of the aminomethanate groups or at least one hydroxy group with at least one aminomethanate group.

14. The sausage casing of claim 13 wherein the crosslinking agent is an aldehyde.

15. The sausage casing of claim 14 wherein the crosslinking agent is glutaraldehyde.

16. The sausage casing of claim 13 wherein there are between 0.1 and 10 crosslinks per 100 glucose units in the cellulose.

17. The sausage casing of claim 15 wherein there are between 0.1 and 10 crosslinks per 100 glucose units in the cellulose.

18. The sausage casing of claim 1 wherein the sausage casing is a shirred sausage casing.

19. The sausage casing of claim 2 wherein the sausage casing is a shirred sausage casing.

20. The sausage casing of claim 3 wherein the sausage casing is a shirred sausage casing.

21. The sausage casing of claim 4 wherein the sausage casing is a shirred sausage casing.

22. The sausage casing of claim 5 wherein the sausage casing is a shirred sausage casing.

23. The sausage casing of claim 8 wherein the sausage casing is a shirred sausage casing.

24. The sausage casing of claim 10 wherein the sausage casing is a shirred sausage casing.

25. The sausage casing of claim 11 wherein the sausage casing is a shirred sausage casing.

26. The sausage casing of claim 12 wherein the sausage casing is a shirred sausage casing.

27. The sausage casing of claim 13 wherein the sausage casing is a shirred sausage casing.

28. The sausage casing of claim 15 wherein the sausage casing is a shirred sausage casing.

29. The sausage casing of claim 16 wherein the sausage casing is a shirred sausage casing.

* * * * *